(12) United States Patent
Gordon et al.

(10) Patent No.: US 12,110,233 B2
(45) Date of Patent: Oct. 8, 2024

(54) ACTIVE HIGH PURITY MAGNESIUM OXIDE AND ITS PRODUCTION METHOD

(71) Applicant: JOINT STOCK COMPANY KAUSTIK, Volgograd (RU)

(72) Inventors: Elena Petrovna Gordon, Volgograd (RU); Alla Vitalievna Korotchenko, Volgograd (RU); Nadezhda Illarionovna Levchenko, Volgograd (RU); Igor Nikolaevich Sizykh, Volgograd (RU); Tatiana Sergeevna Ugnovenok, Volgograd (RU)

(73) Assignee: JOINT STOCK COMPANY KAUSTIK, Volgograd (RU)

( * ) Notice: Subject to any disclaimer, the term of this patent is extended or adjusted under 35 U.S.C. 154(b) by 744 days.

(21) Appl. No.: 17/267,416

(22) PCT Filed: Aug. 7, 2019

(86) PCT No.: PCT/RU2019/000558
§ 371 (c)(1),
(2) Date: Feb. 9, 2021

(87) PCT Pub. No.: WO2020/032829
PCT Pub. Date: Feb. 13, 2020

(65) Prior Publication Data
US 2021/0292180 A1    Sep. 23, 2021

(30) Foreign Application Priority Data
Aug. 9, 2018  (RU) .......................... RU2018129348

(51) Int. Cl.
*C01F 5/08*     (2006.01)
(52) U.S. Cl.
CPC ............ *C01F 5/08* (2013.01); *C01P 2004/61* (2013.01); *C01P 2006/12* (2013.01); *C01P 2006/14* (2013.01); *C01P 2006/80* (2013.01)
(58) Field of Classification Search
CPC ...... C01F 5/08; C01F 5/14; C01F 5/02; C01F 5/22; C01P 2004/61; C01P 2004/51; C01P 2006/12; C01P 2006/14; C01P 2006/80; C01P 2006/22; C01P 2002/72
See application file for complete search history.

(56) References Cited

U.S. PATENT DOCUMENTS

| | | | |
|---|---|---|---|
| 3,800,032 A | 3/1974 | Eberle et al. | |
| 4,443,425 A | 4/1984 | Sopp et al. | |
| 9,834,659 B2 * | 12/2017 | Matsui | ...................... C01F 5/22 |
| 2014/0134097 A1 | 5/2014 | Ohsaki | |
| 2017/0044417 A1 * | 2/2017 | Fujimoto | .............. C08L 101/00 |

FOREIGN PATENT DOCUMENTS

| | | |
|---|---|---|
| EP | 0370728 B1 | 1/1995 |
| JP | 5037066 A2 | 2/1993 |
| JP | 2000034119 A | 2/2000 |
| JP | 2016003174 A * | 1/2016 |
| RU | 2281248 C1 | 8/2006 |
| WO | 2014/155764 A1 | 10/2014 |

OTHER PUBLICATIONS

Sakamoto JP2016003174A English Translation (Year: 2016).*
International Search Report dated Dec. 5, 2019 , prepared in International Application No. PCT/RU2019/000558.
Written Opinion dated Dec. 5, 2019 , prepared in International Application No. PCT/RU2019/000558.
International Preliminary Report on Patentability dated Feb. 9, 2021, prepared in International Application No. PCT/RU2019/000558.

* cited by examiner

*Primary Examiner* — Samir Shah
*Assistant Examiner* — Jordan W Taylor
(74) *Attorney, Agent, or Firm* — Ryan L. Marshall; Barnes & Thornburg LLP

(57) ABSTRACT

The invention is referred to chemical technology, namely to active high-purity magnesium oxide and its production method. Active high-purity magnesium oxide, including the surface treated one, has BET specific surface area from 70 to 200 $m^2/g$, average particle size (d50) determined by laser diffraction method not more than 10 microns, iodine activity in the range from 70 to 200 mg J/g MgO, citric activity not more than 40 s, pore volume in the range from $3.2 \times 10^{-2}$ $cm^3/g$ to $10.2 \times 10^{-2}$ $cm^3/g$, diameter of 10% of the particles not more than 2 microns, diameter of 90% of the particles not more than 30 microns, mass fraction of residue on the 150 micron sieve not more than 1%, mass fraction of residue on the 45 micron sieve not more than 2%, mass fraction of chlorides not more than 0.1%, mass fraction of calcium not more than 0.1%, mass fraction of substances insoluble in hydrochloric acid not more than 0.05%, mass fraction of iron not more than 0.005%, mass fraction of impurities of each of Ti, Co, Mo, V, Sb, Ba cations not more than 1 ppm, Pb, Cd, As, Hg not more than 0.1 ppm.

12 Claims, No Drawings

ACTIVE HIGH PURITY MAGNESIUM OXIDE AND ITS PRODUCTION METHOD

This application is a National Stage application of International Application No. PCT/RU2019/000558, filed Aug. 7, 2019, the entire contents of which is hereby incorporated herein by reference. This application also claims the benefit under 35 U.S.C. § 119 of Russian Patent Application No. 2018129348, filed Aug. 9, 2018, the entire contents of which is hereby incorporated herein by reference.

The invention relates to chemical technology, namely to active high purity magnesium oxide and its production method.

Magnesium oxide is used in the production of refractory materials, in the electrical engineering and pulp and paper industry, in the construction, in the production of rubber, periclase etc.

The production of active magnesium oxide is based on thermal decomposition of magnesium compounds of natural and synthetical origin: magnesium carbonate, basic magnesium carbonate, magnesium hydroxide, magnesium chloride [M. E. Pozin Technology of mineral salts (fertilizers, pesticides, industrial salts, oxides and acids), p.I, L.: Khimiya, 1974, 792 p.; Mark A. Shand. The Chemistry and technology of magnesia. Wiley-Interscience, 2006].

Magnesium oxide produced by thermal destruction of natural raw materials contains considerable amounts of impurities that are present in natural raw materials. Synthetic magnesium oxide produced from purified reagents, are characterized by high chemical purity.

It is known that depending of raw material calcination temperature, magnesium oxide can be slightly calcined, hard-burned, dead-burned, and fused. Accordingly, in regard of activity magnesium oxide can be active (light) and inactive (heavy) [M.E. Pozin Technology of mineral salts (fertilizers, pesticides, industrial salts, oxides and acids), p.I, L.: Khimiya, 1974, 792 p.; Mark A. Shand. The Chemistry and technology of magnesia. Wiley-Interscience, 2006].

Active magnesium oxide is used as a filler for rubbers, adhesives, plastic materials, polymers, as stabilizers in the production of chloroprene rubbers, as curative agents of organic solvents, in the production of catalysts, advanced ceramic, specialty glass (lenses of photographic, cinematographic, astronomical objectives), in pharmaceutical, pharmacopoeial and food industry, in the production of magnesia cements and other magnesium-containing materials.

One of the most important indices of active magnesium oxide is its high reactivity. The activity of magnesium oxide can be described using such characteristics as specific surface area, iodine adsorption value, citric acid reactivity, acetic acid reactivity, typical reactivity.

It should be noted that for some active magnesium oxide applications, such as pharmaceutics, pharmacopoeia, food industry, production of advanced ceramic, specialty glass, catalysts etc. chemical purity is of great importance. There is a description of magnesium oxide for food additives [patent JP2003033159, published in 2003] having lead mass fraction max. 10 ppm, the content of particles with a diameter more than 8 μm max. 5 vol. % (laser diffraction method), specific surface area determined by BET method in the range of 1-50 m$^2$/g, citric acid reactivity 80 up to 450 s. In the examples the chemical purity of the produced magnesium oxide determined by Inductively Coupled Plasma Spectrometry (ICP) is given—the mass fractions of impurities were: lead Pb 0.3-1.4 ppm, chromium Cr 2 ppm maximum, cadmium Cd 0.2-2.4 ppm, copper Cu 0.1-0.2 ppm. However, the values for specific surface area and citric acid reactivity indicate that the said magnesium oxide is not active.

A method of active magnesium oxide with specific surface area 10-200 m$^2$/g, the diameter of secondary particles d50 in the range of 0.1-1.5 μm and d90 max. 3.0 μm is known [patent EP 0370728, published in 1989], in which magnesium chloride or magnesium nitrate are used to produce magnesium oxychloride with formula $Mg(OH)_{2-x}A_x \cdot mH_2O$, in which A stands for Cl or $NO_3$, x is a number from 0 to 0.2 and m is an integral number from 0 to 6, with further heating the obtained product in the mother liquor of the obtained product at positive or atmospheric pressure at temperature 50-200° C. The disadvantage of this method is producing pseudo-amorphous deposit of magnesium oxide at the first stage, the suspension of which is a viscous jelly-like hard-to-stir substance. To achieve homogeneity of such a reaction mass special stirring devices and high stirring speeds are required, which results in increased complicacy and cost of the technology when using this method on an industrial scale.

Also a method of active magnesium oxide production [U.S. Pat. No. 3,800,032, published in 1974] by washing either magnesium oxide produced by thermal splitting or magnesium hydroxide with water and further drying and calcining temperatures 300-500° C. is known. Washing consists of the following stages: a) dispersing magnesium hydroxide or magnesium oxide in water at temperature 80-100° C. with forming a turbid liquid having turbidity density 5-20%; b) vigorous agitation of the said turbid liquid during 5-60 min at temperature 80-110° C. by introducing steam into the turbid liquid and c) separation of magnesium hydroxide or magnesium oxide from the turbid liquid. Magnesium oxide mentioned in the examples has a high activity—the iodine absorption number is 136-192 mg I-eqv./100 g of MgO. However, the authors do not indicate the chemical purity of the produced magnesium oxide, its particle size distribution and other parameters.

The authors [JP5037066, published in 2012] produce active magnesium oxide with specific surface area, BET, in the range from 230 to 500 m$^2$/g and passing through the 0.25-mm sieve min. 80%, by heating and calcining magnesium hydroxide powder having BET specific surface area in the range from 10 to 200 m$^2$/g and passing through the 0.25-mm sieve min. 80 wt.-% at temperature 250-550° C. under pressure max. 300 Pa during 1-10 h. The disadvantage of this method is complicated instrumentation used to calcine magnesium hydroxide under vacuum. The produced magnesium oxide has a rather large particle size, the chemical purity of the product is not given.

In the inventions [JP3563269, published in 2004; JP3980569, published in 2007; JP3939102, published in 2007] production of magnesium oxide with low lead content by calcining magnesium oxide produced by interaction of sea water and calcium hydroxide containing lead or lead compounds in the presence of halogen source being a halogenide or a halogen gas at temperature 700-1300° C. The produced magnesium oxide with lead content 2×10−7 mol/l of magnesium oxide is intended for the use as an additive for fertilizers, food, raw materials for medicines, cosmetic products etc. Unfortunately, the authors indicate neither activity characteristics of the produced magnesium oxide such as specific surface area or iodine absorption number nor its particle size distribution.

The closest, the one taken as a prototype is the invention [WO2014155764, published in 2014], in which magnesium oxide particles have specific surface area, BET, in the range from 143 to 200 m²/g, average particle size, by laser diffraction method, max. 5 μm and sieve residue after sifting with 45-μm sieve max. 0.1 wt.-%. The method of producing the said magnesium oxide particles includes the following stages: interaction of water soluble magnesium salt, sea water or salty water with aqueous solution of an alkali metal hydroxide, aqueous solution of an alkaline earth metal hydroxide or aqueous solution of ammonia with production of a dispersion in a liquid; introducing the dispersion in a liquid into the reaction of the seed crystal one time or multiple times at temperature in the range from 1 to 100° C. or into hydrothermal treatment at temperature 100-200° C. with producing initial material for calcining and calcining the initial material at temperature in the range from 350 to 900° C. In the given examples a significant excess of magnesium chloride at the synthesis of magnesium hydroxide is indicated: the molar ratio $Mg^{+2}/OH$ is 1/1.8, which results in producing cake with high $MgCl_2$ content, and thus in increasing the water volume for washing magnesium hydroxide free from chlorides, as well as in producing magnesium oxide with increased content of chlorides. The authors do not indicate the chemical purity of the obtained product, which does not allow for assessing its usability in the main active magnesium oxide applications.

To use active magnesium oxide in some applications, for example in the pharmaceutical industry, when using it as a precursor to produce magnesium-bearing compounds, preparation of active magnesium oxide water suspensions is necessary. However, active magnesium oxide water suspensions often have gel or creamy consistency, which complicates their stirring, pumping and dosing.

The goal of this invention is production of high purity active magnesium oxide having specific surface area (BET) 70-200 m²/g, preferably 130-180 m²/g, average particle size (d50), by laser diffraction method, max. 10 μm, preferably max. 8 μm, iodine adsorption value in the range of 70-200 mg I/g MgO, porosity $3.2 \times 10^{-2}$ cm³/g-$10.2 \times 10^{-2}$ cm³/g, citric acid reactivity max. 40 s, diameter of 10% of particles max. 2 μm, diameter of 90% of particles max. 30 μm, mass fraction of residue on 150-μm sieve max. 1%, mass fraction of residue on 45-μm sieve not more than 2%, mass fraction of chlorides max. 0.1%, mass fraction of calcium max. 0.1%, mass fraction of substances insoluble in hydrochloric acid max. 0.05%, mass fraction of iron max. 0.005%, mass fractions of impurities of each of the cations Ti, Co, Mo, V, Sb, Ba not more than 1 ppm, Pb, Cd, As, Hg max. 0.1 ppm, preferably mass fraction of carbonates max. 1 wt.-%, dynamic viscosity of water suspension max. 30 cPs.

The goal set is achieved by producing active high purity magnesium oxide, possibly surface treated, by calcining magnesium hydroxide produced by reaction of a magnesium salt solution and an alkaline agent. Magnesium hydroxide crystals are produced by a continuous method in separated and isolated from each other zones: the seed crystal treatment zone, the magnesium hydroxide crystal formation and growth zone and the crystal build-up and agglomeration zone, while aqueous solution of magnesium chloride in the presence of liquid petroleum products n magnesium hydroxide seed crystal suspension in the amount of 1-80% of the total weight of the fed initial reagents are fed to the seed crystal treatment zone, the treated hydroxide seed crystal suspension from the previous zone and the alkaline agent with molar ratio $OH^-:Mg^{++}$ within the range of (1.9=2.1): 1 are directed to the primary crystal formation and growth zone, the suspension from the previous zone is directed to the crystal build-up and agglomeration zone, and in all zones the temperature not lower than 40° C. is kept, the duration of stay of magnesium hydroxide crystal suspension in each isolated zone is not less than 20 min.

It is known [Wasserman, I.M. Chemical sedimentation from solutions] that filtration and sedimentation properties of sediments depend on temperature, duration of exposure, pH of the medium, molar ratio of reactants, concentration of reacting substances, inoculation with sediment, etc. It has been noted that the principles valid for the most studied dilute solutions turn out to be inapplicable for concentrated solutions. At the same time, the use of highly mineralized brines containing more than 200 g/l magnesium chloride in technological processes without prior dilution makes it possible to reduce the volume of reactor and tank equipment and thereby improve the technical and economic parameters of the process. Therefore, to obtain suspensions with improved sedimentation and filtration properties it is necessary to select and strictly observe technological parameters of the process.

In order to obtain magnesium hydroxide sediment in crystalline form it is necessary to maintain the temperature in the dosing zone of the initial reagents and in the sediment holding zone not lower than 40° C. This makes it possible to avoid even local centers of sediment formation in pseudoamorphic form, which is a gel-like viscous substance difficult to mix. Then, in order to obtain a suspension with improved sedimentation and filtration properties, it is necessary to ensure crystal growth and agglomeration of primary magnesium hydroxide particles. This is promoted by sufficient residence time, during which secondary enlargement of particles occurs due to their sticking into blocks and agglomeration, availability of seed containing crystals with the required properties, guiding the formation of crystals according to a given type and multiple build-up, improving the structure of the sediment. Treatment of seed crystals with magnesium salt solution, which is the initial reagent, promotes, with subsequent dosing of alkaline agent, which is also the initial reagent, nucleation of primary crystals on their surface, formation according to the given type and subsequent enlargement of crystals. An important factor for these processes is slow stirring that does not destroy the resulting blocks and agglomerates of particles.

Technical embodiment of the above processes is continuous formation of magnesium hydroxide in a cascade of reactors with separation of reaction zones according to their functional purpose: In the first reactor, into which a suspension of seed crystals and a magnesium salt solution are simultaneously dispensed in the presence of liquid petroleum products, the treatment of the seed crystals takes place; In the second reactor, in which the magnesium salt solution with treated seed crystals and an alkaline agent are simultaneously dosed into the reaction mass, representing a suspension of magnesium hydroxide crystals in sodium chloride solution, formation of primary magnesium hydroxide particles of crystal form occurs; in subsequent reactors maturation, building up and agglomeration of secondary particles on the already formed magnesium hydroxide crystals occur. The reaction mass from the last reactor containing magnesium hydroxide crystals with the required filtration and sedimentation properties serves as a seeding agent.

Three to five reactors in the specified cascade of continuous reactors are necessary and sufficient to provide separated functional zones.

Residence time in each separate zone is at least 20 minutes, preferably from 20 minutes to 2 hours depending on the concentration of the reactants and the selected temperature, which should not be below 40° C. Residence time in a separate zone for less than 20 min does not ensure the required filtration and sedimentation properties of the resulting suspension, while residence time longer than 2 hours is economically inefficient.

Magnesium chloride solution of synthetic or natural origin is used as a water-soluble magnesium salt. For example, bischofite solution, possibly previously purified from heavy metals and/or iron, and/or sulfates, and/or boron, and/or bromine, and/or other undesirable impurities by known methods.

Agglomerates of magnesium hydroxide crystals obtained by the proposed method provide effective filtration and sedimentation properties, but contribute to obtaining magnesium oxide with increased particle size distribution. Liquid oil products that are the products of direct and/or vacuum oil refining with initial boiling point not less than 150° C., final boiling point not more than 400° C., density within the range from 750 to 880 kg/m$^3$ in the amount of 0.0001-0.01% wt are added to magnesium chloride solution for further destruction of agglomerates. Examples of liquid oil products are diesel fuel, low-viscosity marine fuel, kerosene and similar oil products.

Liquid oil products are adsorbed to the magnesium hydroxide seed crystals with the formation of a thin film in the zone of seed crystals treatment. Subsequently, during calcination of magnesium hydroxide crystals agglomerates in the calcining furnace liquid oil products boiling and evaporation at temperatures in the range from 150 to 400° C. occur, which leads to secondary particles agglomerates rupture and destruction, facilitating milling and reducing the size of secondary particles of the obtained active high-purity magnesium oxide. Vaporized liquid oil products are decomposed in a calcining furnace to $CO_2N\ H_2O$.

Adding liquid oil products to the magnesium chloride solution, as well as the production by the proposed method contributes to the formation of active high-purity magnesium oxide particles allowing to obtain aqueous suspensions with reduced viscosity without forming gel-like and creamy-like consistencies complicating stirring, pumping and dosing.

A solution of alkali metal hydroxide such as sodium hydroxide solution is used as an alkaline agent.

Molar ratio of alkaline agent ions and magnesium chloride OH—: Mg++ within (1,9=2,1): 1 is preferable. An increase in the excess of chloride will lead to contamination of the obtained magnesium hydroxide with magnesium chloride, the need to increase the volume of water for its washing, as well as increase the mass fraction of chlorides in the obtained magnesium oxide. An increase in the excess of the alkaline agent will lead to the formation of a finely dispersed sediment of magnesium hydroxide that is difficult to filter, which will lead to process efficiency reduction.

Experimentally determined effective mixing speed providing sufficient contact area of the phases, but not destroying the formed agglomerates of particles, is within the range of 20 to 300 rpm.

A suspension of prepared magnesium hydroxide crystals in mother liquor is used as a seed. The seed is fed to the first functional zone in an amount of 1-80% of the total mass of the initial reagents fed.

Following the crystal build-up and agglomeration zone magnesium hydroxide crystals can be directed to hydrothermal recrystallization at a temperature in a range of 120 to 220° C., pressure in a range of 0.1 to 2.3 MPa and for a duration comprised between 1 and 24 h. Hydrothermal recrystallization of magnesium hydroxide crystals promotes more effective washing of magnesium hydroxide crystals from chlorides, as well as reduction of sizes of secondary magnesium hydroxide particles.

Hydrothermal recrystallization in a wide range of reagents concentrations is possible to perform in the reaction mother liquor; preferred content of 10 magnesium hydroxide is within in the range from 2 to 10% wt. Separation of magnesium hydroxide crystals from the mother liquor is carried out by any known method, such as filtration of the resulting suspension or sedimentation, followed by filtration of the thickened part.

Washing of magnesium hydroxide crystals from chlorides is carried out by any known method, such as washing of filter residue and/or residue repulsion with subsequent filtration. An aqueous solution of sodium hydroxide with a mass fraction of 0.01-0.50% is used as a washing fluid to increase the efficiency of washing.

Washing of magnesium hydroxide crystals is carried out in one or two stages: at the first stage, magnesium hydroxide crystals are washed with demineralized water and/or alkaline water representing an aqueous solution of sodium hydroxide with a mass fraction of 0.01-0.50% using a filter; at the second stage, magnesium hydroxide crystals are dispersed in an aqueous medium, which includes demineralized water and/or alkaline water representing aqueous solution of sodium hydroxide with a mass fraction of 0.01-0.50%, mass ratio water medium/magnesium hydroxide in the range (5+30): 1, to form a suspension of magnesium hydroxide and then filtered.

To obtain magnesium oxide, washed magnesium hydroxide crystals are calcined in a furnace at a temperature ranging from 300 to 700° C. and then ground. Calcination of magnesium hydroxide crystals is carried out periodically or continuously.

The resulting active high-purity magnesium oxide has BET specific surface from 70 to 200 m$^2$/g, average particle size (d50) determined by laser diffraction not more than 10 μm, iodine activity in the range from 70 to 200 mg I/g MgO, citric activity not more than 40 s, pore volume in the range from $3.2\times10^{-3}$ cm$^3$/g to $10.2\times10^{-2}$ cm$^3$/g; diameter of 10% of the particles not more than 2 μm and diameter of 90% of the particles no more than 30 μm, mass fraction of residue on the 150 μm sieve not more than 1%, mass fraction of residue on the 45 μm sieve not more than 2%, mass fraction of chlorides not more than 0.1%, mass fraction of calcium not more than 0.1%, mass fraction of substances insoluble in hydrochloric acid not more than 0.05%, mass fraction of iron not more than 0.005%, mass fraction of impurities of each of Ti, Co, Mo, V, Sb, Ba cations not more than 1 ppm, Pb, Cd, As, Hg not more than 0.1 ppm.

Specified magnesium oxide has mass fraction of carbonates not more than 1%, mass fraction of manganese Mn not more than 2 ppm.

Specified magnesium oxide has a dynamic viscosity of the aqueous suspension not more than 30 cP, which allows to obtain aqueous suspensions with reduced viscosity, technologically convenient for mixing, pumping and dosing.

Active high-purity magnesium oxide obtained by the above method can be modified with one or more surface treatment agents and/or binding silane agents. Compounds selected from the group of saturated and unsaturated fatty acids containing from 8 to 20 carbon atoms or their alkali metal salts and/or mixtures thereof are used as surface treatment agents. Examples of such compounds are stearic acid, oleic acid, lauryl acid, palmitic acid, behenic acid, myristic acid, tall oil fatty acids and others.

Compounds selected from the group of organofunctional trialkoxysilanes including alkyltriethoxysilanes, alkyltrimethoxysilanes, alkenyltriethoxysilanes, alkenyltrimethoxysilanes, aminosilanes, etc. and/or mixtures thereof are used as silane binding agents. Examples of such compounds include methyltriethoxysilane, octyltriethoxysilane, vinyltrimethoxysilane, vinyltriethoxysilane, vinyl tris(2-methoxyethoxy)silane, 3-methacryloxypropyltrimethoxysilane, 2-(3,4-epoxycyclohexy)ethyltrimethoxysilane, glycidoxypropyltrimethoxysilane, aminopropyltriethoxysilane, aminopropyltrimethoxysilane and others.

It is preferable to use surface treatment agents in an amount ranging from 0.1% to 5.0% wt calculated on magnesium oxide.

Surface treatment is carried out by any known method, such as suspension or dry method.

Active high-purity magnesium oxide obtained by the proposed method has adjustable activity and particle size distribution and high chemical purity allowing its use in pharmaceutical, pharmacopoeial and food industries, in the production of catalysts, special ceramics, special glasses, as a filler for rubbers, adhesives, plastic masses, polymers, as stabilizers in production of chloroprene rubbers, refining additives of organic solvents, in production of magnesia cements and other magnesium-containing materials The following methods of analysis were used to analyze magnesium oxide:
- BET specific surface area and pore volume were determined with a high-speed surface area and pore size analyzer "Nova 2200 e" manufactured by Quantachrome Instruments, USA;
- grain-size distribution was determined by laser diffraction using "Malvern MasterSizer-2000 E" device with Scirocco 2000 module of Malvern Limited, UK;
- iodine activity (in mg I/g MgO) was determined by iodometric titration in carbon tetrachloride medium;
- citric acid activity (in seconds) was determined as the time of crimson color appearance after adding 0.4 N citric acid solution with phenolphthalein indicator to magnesium oxide suspension in water at 29+2° C.;
- mass fraction of Cl-chlorides and $SO_4^{2-}$ sulfates was determined by phototurbidimetric method;
- mass fraction of substances insoluble in hydrochloric acid was determined by gravimetric method according to GOST 4526 "Reagents. Magnesium oxide";
- mass fraction of residue on 150 μm sieve was determined by dry sieving with a brush;
- mass fraction of residue on 45 μm sieve was determined by wet sieving under water stream;
- mass fraction of Fe, Ca, Pb, Cd, As, Hg, Ti, Co, Mo, V, Sb, Ba, Mn impurities was determined by atomic emission spectrometry with inductively coupled plasma using "Optima 8000" device manufactured by PerkinElmer, USA;
- mass fraction of $CO_3^{2-}$ carbonates was determined by neutralization method;
- dynamic viscosity was determined with a Brookfield viscometer. Magnesium oxide (50 g) was suspended in water (400 ml) at room temperature for 1 h and the dynamic viscosity of the resulting suspension was determined.

The proposed method of active high-purity magnesium oxide production is illustrated by the following examples.

EXAMPLE 1

Magnesium hydroxide crystals production process is carried out in a continuous mode at the installation, which is a cascade of three reactors equipped with anchor-type stirrers with a number of revolutions equal to 37. Operating volume of the reactors is 120 dm³. Temperature of 50-60° C. is maintained in all reactors of the cascade.

Bischofite solution pre-cleaned from heavy metals and iron with mass fraction of magnesium chloride equal to 31.6%, mass fraction of diesel fuel equal to 0.001% and flow rate of 24.8 kg/h and seed with flow rate of 38.5 kg/h are continuously fed to the first reactor of the cascade. The seed is a suspension of finished crystals coming from the last reactor of the cascade.

Suspension of magnesium hydroxide seed crystals treated with bischofite solution enters from the first reactor to the second reactor of the cascade. At the same time sodium hydroxide solution with mass fraction of 9.3% and flow rate of 70.7 kg/h is fed to the second reactor of the cascade. The resulting suspension of magnesium hydroxide crystals is sent from the second reactor to the third reactor of the cascade containing suspension of formed magnesium hydroxide crystals. Residence time in the reactor cascade is 1 h.

Magnesium hydroxide crystals are filtered, washed with alkaline water which is an aqueous solution of sodium hydroxide with mass fraction of 0.05%, mass ratio of alkaline water/magnesium hydroxide equal to 10/1 using a filter, then dispersed in alkaline water, which is an aqueous solution of sodium hydroxide with mass fraction of 0.01%, mass ratio of alkaline water/magnesium hydroxide equal to 20/1 to form a suspension of magnesium hydroxide and then filtered.

After final washing the magnesium hydroxide crystals are heated in the furnace at a rate of 10° C./min, calcined for 2 hours at a temperature of 600° C., ground with a hammer mill and active high-purity magnesium oxide is obtained. Characteristics of the obtained magnesium oxide are given in Tables 1-2.

Example 2

Production of magnesium oxide is similar to the example 1, except that the bischofite solution with mass fraction of low-viscosity marine fuel 0.0002% is fed; sodium hydroxide solution with mass fraction of 9.3% and flow rate of 71.1 kg/h is fed into the second reactor of the cascade; washing with demineralized water at mass ratio of demineralized water/magnesium hydroxide equal to 6/1 is carried out using the filter, after filter washing magnesium hydroxide crystals are dispersed in demineralized water and filtered.

Magnesium hydroxide cake is calcined at 450° C.

Characteristics of the obtained magnesium oxide are given in Tables 1-2.

Example 3

Production of magnesium oxide is carried out similarly to example 1, except that bischofite solution, purified from heavy metals, iron and sulfates with mass fraction of low-viscosity marine fuel of 0.0002% is fed. The magnesium hydroxide suspension from the third reactor of the cascade is directed to hydrothermal recrystallization for 2 hours at temperature of 170° C. and pressure of 0.6 MPa; washing of magnesium hydroxide crystals is done with a filter, mass ratio of alkaline water/magnesium hydroxide equal to 6/1, dispersion of crystals is not carried out.

Magnesium hydroxide cake is calcined at 450° C.

Characteristics of the obtained magnesium oxide are given in Tables 1-2.

Example 4

Magnesium oxide is obtained similarly to Example 3, except that after washing magnesium hydroxide crystals are dispersed in alkaline water, which is an aqueous sodium hydroxide solution with mass fraction of 0.05%, mass ratio of alkaline water/magnesium hydroxide equal to 20/1, to form a magnesium hydroxide suspension and then filtered.

Magnesium hydroxide cake is calcined at 450° C.

Characteristics of the obtained magnesium oxide are given in Tables 1-2.

Example of Comparison 361.5 kg of sodium hydroxide solution with mass fraction of 9.2% is loaded into a reactor with a working volume of 500 dm$^3$ and 118.5 kg of bischofite solution with magnesium chloride mass fraction of 33.46% is dosed. The reaction mixture shall be kept stirred for 2 hours at 20-30° C. Then magnesium hydroxide crystals are filtered and washed with demineralized water at mass ratio of alkaline water/magnesium hydroxide equal to 10/1 using a filter. Magnesium hydroxide crystals are heated in a furnace at a rate of 10° C./min, calcined for 2 hours at temperature of 600° C., ground with a hammer mill and magnesium oxide is obtained.

Characteristics of the obtained magnesium oxide are shown in Table 1.

Example of Surface Treatment 200 g of magnesium oxide obtained as described in example 3 is loaded into a Henschel mixer, 7 g of stearic acid is fed in, and the mixture is stirred at 80° C. for 10-20 min. Surface-treated magnesium oxide with mass fraction of stearic acid equal to 3.5% is obtained.

The above examples illustrate the essence of the invention, are illustrative and do not limit the field of the claimed invention.

5 The given examples demonstrate that the proposed production method allows obtaining active high-purity magnesium oxide with adjustable activity, chemical purity and particle size distribution.

TABLE 1

Magnesium oxide characteristics

| Characteristic Name | Example 1 | Example 2 | Example 3 | Example 4 | Example of Comparison |
|---|---|---|---|---|---|
| Specific surface area, m$^2$/g | 78 | 160 | 183 | 180 | 55 |
| Iodine activity, mg I/g MgO | 75 | 158 | 175 | 173 | 52 |
| Citric activity, s | 28 | 12 | 8 | 8 | 42 |
| Pore volume, cm$^3$/g | $3.7 \times 10^{-2}$ | $8.0 \times 10^{-2}$ | $7.2 \times 10^{-2}$ | $7.2 \times 10^{-2}$ | $2.5 \times 10^{-2}$ |
| Mass fraction of chlorides Cl$^-$, % | 0.07 | 0.08 | 0.08 | 0.018 | 0.25 |
| Mass fraction of calcium Ca, % | 0.003 | 0.017 | 0.003 | 0.003 | ? |
| Mass fraction of substances insoluble in hydrochloric acid, % | 0.02 | 0.02 | 0,01 | 0.01 | 0.2 |
| Mass fraction of iron, Fe, ppm | 48 | 45 | 20 | 20 | 490 |
| Mass fraction of carbonates CO3$^{2-}$ | 0.6 | 0.8 | 0.2 | 0.3 | 0.7 |
| Mass fraction of sulfates SO$_4^{2-}$, % | 0.03 | 0.03 | 0.006 | 0.006 | 0.06 |
| Dynamic viscosity, cP | 25 | 20 | 12 | 8 | 590 |
| Mass fraction of losses on ignition at 900° C. Particle size distribution, μm | 2.5 | 5.1 | 4.8 | 4.7 | 8.5 |
| D10 | 1.2 | 1.4 | 0.7 | 0.7 | 3.5 |
| D50 | 5.1 | 6.5 | 1.3 | 1.4 | 22.5 |
| D90 | 15.8 | 30.2 | 2.6 | 4.9 | 48.6 |
| residue on 150 μm sieve, % | 0.22 | 0.37 | <0.1 | <0.1 | 1.5 |
| residue on 45 μm sieve, % | 0.9 | 0.9 | <0.1 | <0.1 | 10.8 |

TABLE 2

Content of heavy metals and toxic substances in magnesium oxide, obtained according to the examples 1-4

| Name | Mass fraction, ppm |
|---|---|
| Lead, Pb | less than 0.1 |
| Cadmium, Cd | less than 0.1 |
| Arsenic, As | less than 0.1 |
| Mercury, Hg | less than 0.1 |
| Titanium, Ti | less than 1 |
| Cobalt, Co | less than 1 |
| Molybdenum, Mo | less than 1 |
| Vanadium, V | less than 1 |
| Antimony, Sb | less than 1 |
| Barium, Ba | less than 1 |
| Manganese, Mn | less than 2 |

The invention claimed is:
1. Active high-purity magnesium oxide having:
BET specific surface area from 70 to 200 m$^2$/g, average particle size (d50) determined by laser diffraction method not more than 10 microns, characterized by having iodine activity in the range from 70 to 200 mg J/g MgO, citric acid activity not more than 40 s, pore volume in the range from $3.2 \times 10^{-2}$ cm$^3$/g to $10.2 \times 10^{-2}$ cm$^3$/g, diameter of 10% of the particles not more than 2 microns, diameter of 90% of the particles not more than 30 microns, mass fraction of residue on the 150 micron sieve not more than 1%, mass fraction of residue on the 45 micron sieve not more than 2%, dynamic viscosity of an aqueous suspension of not more than 30 cP, mass fraction of chlorides not more than 0.1%, mass fraction of calcium not more than 0.1%, mass fraction of substances insoluble in hydrochloric acid not more than 0.05%, mass fraction of iron not more than 0.005%, mass fraction of impurities of each of Ti, Co, Mo, V, Sb, Ba cations not more than 1 ppm, and mass fraction of impurities of each of Pb, Cd, As, Hg not more than 0.1 ppm.

2. Active high-purity magnesium oxide according to claim 1 characterized by having BET specific surface area within the range from 130 to 180 m$^2$/g.

3. Active high-purity magnesium oxide according to claim 1 characterized by having the average particle size (d50) determined by laser diffraction method not more than 2 microns.

4. Active high-purity magnesium oxide according to claim 1 characterized by having a mass fraction of chlorides not more than 0.02% wt.

5. Active high-purity magnesium oxide according to claim 1 characterized by having a mass fraction of calcium not more than 0.05% wt.

6. Active high-purity magnesium oxide according to claim 1 characterized by having a mass fraction of carbonates wt not more than 1% wt.

7. Active high-purity magnesium oxide according to claim 1 characterized by having a mass fraction of sulphates not more than 0.01%.

8. Active high-purity magnesium oxide according to claim 1 characterized by having a mass fraction of Iron (Fe) not more than 0.003%.

9. Active high-purity magnesium oxide according to claim 1 characterized by having a mass fraction of manganese (Mn) not more than 2 ppm.

10. Active high-purity magnesium oxide according to claim 1 characterized by having a mass of residue on the 150 micron sieve 0.05% not more than 0.05%.

11. Active high-purity magnesium oxide according to claim 1 characterized by having a mass fraction of residue on the 45 micron sieve not more than 0.1%.

12. Active high-purity magnesium oxide according to claim 1 characterized by surface treatment with one or several silane coupling agents, selected from organofunctional trialkoxysilanes group, which includes alkyl triethoxysilane, alkyl trimethoxysilanes, alkenyl triethoxysilanes, and alkenyl trimethoxysilanes and/or one or several surface treating agents selected from saturated and unsaturated fatty acids group, containing from 8 to 20 carbon atoms, which includes stearic acid, oleic acid, palmitic acid, behenic acid, myristic acid, fatty acids of tall oil and/or their salts of alkali and/or alkaline-earth metals and/or their mixtures in the amount of 0.1-5.0% of the magnesium oxide mass.

\* \* \* \* \*

UNITED STATES PATENT AND TRADEMARK OFFICE
CERTIFICATE OF CORRECTION

| | | |
|---|---|---|
| PATENT NO. | : 12,110,233 B2 | Page 1 of 1 |
| APPLICATION NO. | : 17/267416 | |
| DATED | : October 8, 2024 | |
| INVENTOR(S) | : Elena Petrovna Gordon et al. | |

It is certified that error appears in the above-identified patent and that said Letters Patent is hereby corrected as shown below:

In the Claims

Claim 6 (Column 12, Line 6): delete the first instance of "wt".

Signed and Sealed this
Nineteenth Day of November, 2024

*Katherine Kelly Vidal*

Katherine Kelly Vidal
*Director of the United States Patent and Trademark Office*